(12) United States Patent
Lee

(10) Patent No.: US 10,722,881 B2
(45) Date of Patent: Jul. 28, 2020

(54) CENTRIFUGATION DEVICE, CENTRIFUGATION METHOD, AND SEPARATION CONTAINER

(71) Applicant: Jun Seok Lee, Nam-gu (KR)

(72) Inventor: Jun Seok Lee, Nam-gu (KR)

(\*) Notice: Subject to any disclaimer, the term of this patent is extended or adjusted under 35 U.S.C. 154(b) by 879 days.

(21) Appl. No.: 15/129,779

(22) PCT Filed: Mar. 30, 2015

(86) PCT No.: PCT/KR2015/003096
§ 371 (c)(1),
(2) Date: Sep. 27, 2016

(87) PCT Pub. No.: WO2015/147606
PCT Pub. Date: Oct. 1, 2015

(65) Prior Publication Data
US 2017/0128933 A1 May 11, 2017

(30) Foreign Application Priority Data

Mar. 28, 2014 (KR) .................. 10-2014-0037246

(51) Int. Cl.
*B01L 3/00* (2006.01)
*B04B 5/04* (2006.01)
(Continued)

(52) U.S. Cl.
CPC .......... *B01L 3/5021* (2013.01); *B04B 5/0414* (2013.01); *B04B 5/0442* (2013.01);
(Continued)

(58) Field of Classification Search
CPC .......... B01L 3/5021; B01L 2300/0858; B01L 2400/0409; B01L 2400/0478;
(Continued)

(56) References Cited

U.S. PATENT DOCUMENTS 3,800,947 A \* 4/1974 Smith .................. B01L 3/5021
210/117
5,656,154 A \* 8/1997 Meryman ........... A61M 1/0209
210/143
(Continued)

FOREIGN PATENT DOCUMENTS

JP          51-3461       1/1976
JP          06-039316     2/1994
(Continued)

OTHER PUBLICATIONS

KIPO International Search Authority; International Search Report PCT/KR2015/003096 dated Jun. 26, 2015; 3 pages.
(Continued)

*Primary Examiner* — Walter D. Griffin
*Assistant Examiner* — Shuyi S. Liu
(74) *Attorney, Agent, or Firm* — Schwabe, Williamson & Wyatt, P.C.

(57) ABSTRACT

The present invention relates to a centrifugation device, a centrifugation method, and a separation container. More particularly, the present invention relates to a centrifugation device for separating substances from a body fluid and tissue using centrifugal force, the centrifugation device including: a separation container configured to receive, centrifuge, and clean a body fluid and tissue therein and rotate around a central rotation axis; a supply part connected to the separation container and configured to supply a cleaning solution to the separation container; a discharge part connected to the separation container and configured to receive substances separated by centrifugation; valves configured to control flows between the supply part, the discharge part, and the separation container; a driving device configured to rotate the separation container, the supply part, and the discharge part around the central rotation axis, the driving device being installed in a direction perpendicular to the separation con- (Continued)

tainer, the supply part, and the discharge part; and a controller configured to control an operation of the driving unit, wherein the separation container includes: a piston located outside in a radial direction based on the central rotation axis; and an elastic part placed on an outer side of the piston in the radial direction to push the piston in a direction opposite a centrifugal force direction.

6 Claims, 13 Drawing Sheets

(51) Int. Cl.
*B04B 13/00* (2006.01)
*G01N 1/28* (2006.01)

(52) U.S. Cl.
CPC .............. *B04B 13/00* (2013.01); *G01N 1/286* (2013.01); *B01L 2300/0851* (2013.01); *B01L 2300/0858* (2013.01); *B01L 2400/0409* (2013.01); *B01L 2400/0478* (2013.01); *B04B 2005/0485* (2013.01)

(58) Field of Classification Search
CPC ............ B01L 2300/0851; G01N 1/286; B04B 5/0414; B04B 5/0442; B04B 2005/0485; B04B 13/00; B04B 5/02; B04B 7/12; B04B 9/10; B04B 15/06

USPC .................. 210/117, 419, 789, 359; 422/918
See application file for complete search history.

(56) References Cited

U.S. PATENT DOCUMENTS

| | | |
|---|---|---|
| 6,123,655 A | 9/2000 | Fell |
| 8,951,180 B2 | 2/2015 | Eberle |
| 2009/0209402 A1 | 8/2009 | Andersson |
| 2010/0210441 A1* | 8/2010 | Dolecek .............. A61M 1/3693 494/37 |
| 2013/0226150 A1 | 8/2013 | Nash |

FOREIGN PATENT DOCUMENTS

| | | |
|---|---|---|
| JP | 2005-13783 | 1/2005 |
| JP | 2009-535618 | 10/2009 |
| JP | 2011-56260 | 3/2011 |
| WO | 2007126357 | 11/2007 |

OTHER PUBLICATIONS

European Patent Office; Supplementary European Search Report EP15769293; Munich, DE; Dec. 8, 2017; 8 Pages.

* cited by examiner

CENTRIFUGATION DEVICE, CENTRIFUGATION METHOD, AND SEPARATION CONTAINER

TECHNICAL FIELD

The present invention relates to a centrifugation device, a centrifugation method, and a separation container, and more particularly, to a centrifugation device, a centrifugation method, and a separation container that are designed to perform centrifugation, discharging, and cleaning of substances of tissue at a time during a rotation process.

BACKGROUND ART

Centrifuges may be used to separate specific cells or other substances from tissue such as adipose tissue. Such centrifuges using centrifugal force to separate cells or substances from tissue have simple structures and operational mechanisms and are easy to use for separation, and thus the use thereof is widespread.

Such a centrifuge includes a separation container (bowl) which is rotatable and configured to accommodate tissue for centrifugation. As the separation container is rotated after tissue is accommodated in the separation container, substances included in the tissue are subjected to centrifugal force, and thus the substances can be separated from the tissue.

However, when substances are discharged after centrifugation, since the separation container is stopped, centrifugal force disappears, and the centrifuged substances may be mixed again. In addition, if separated substances have to be discharged after the separation container is stopped and then an additional cleaning process is required to clean the separated substances, simple and high-efficiency centrifugation may not be attained.

DETAILED DESCRIPTION OF THE INVENTION

Technical Problem

The present invention is proposed to solve the above-mentioned problems, and an object of the present invention is to provide a centrifugation device configured to discharge and clean substances during rotation for centrifugation without having to stop rotation to discharge the substances or perform an additional manipulation to clean the substances.

Technical Solution

According to an embodiment of the present invention, a centrifugation device for separating substances from a body fluid and tissue using centrifugal force includes: a separation container configured to receive, centrifuge, and clean a body fluid and tissue therein and rotate around a central rotation axis; a supply part connected to the separation container and configured to supply a cleaning solution to the separation container; a discharge part connected to the separation container and configured to receive substances separated by centrifugation; valves configured to control flows between the supply part, the discharge part, and the separation container; a driving device configured to rotate the separation container, the supply part, and the discharge part around the central rotation axis, the driving device being installed in a direction perpendicular to the separation container, the supply part, and the discharge part; and a controller configured to control an operation of the driving unit, wherein the separation container includes: a piston located outside in a radial direction based on the central rotation axis; and an elastic part placed on an outer side of the piston in the radial direction to push the piston in a direction opposite a centrifugal force direction.

Preferably, the controller controls the operation of the driving unit so as to adjust a rotational velocity at which the separation container, the supply part, and the discharge part are rotated.

Preferably, when a rotational velocity of the driving unit increases, the piston of the separation container is moved in the centrifugal force direction, and a cleaning solution flows from the supply part to the separation container and fills the separation container. When the rotational velocity of the driving unit decreases, the elastic part moves the piston of the separation container in the direction opposite the centrifugal force direction, and separated substances in the separation container are discharged to the discharge part.

Preferably, the separation container includes an outlet connected to the discharge part for discharging substances therethrough, and the outlet is located inside based on the central rotation axis.

Preferably, the separation container includes a piston fixing part controlling a displacement of the piston caused by the elastic part by fixing the piston in a predetermined position.

Preferably, when the piston arrives at the predetermined position, the piston fixing part fixes the piston by locking the piston, and when centrifugal force is applied by operation of the driving unit, the piston fixing part releases the piston.

Preferably, the separation container, the supply part, and the discharge part are arranged in a predetermined plane; the central rotation axis extends in a direction perpendicular to the plane; the separation container includes two first containers symmetrically arranged with respect to the central rotation axis; the supply part and the discharge part includes two second containers symmetrically arranged with respect to the central rotation axis, and the second containers are each divided by a barrier wall into two compartments respectively forming the supply part and the discharge part; and the two first containers and the two second containers are symmetrically arranged around the central rotation axis in a cross shape.

Preferably, the separation container, the supply part, and the discharge part are arranged in a predetermined plane; the central rotation axis extends in a direction perpendicular to the plane; the separation container includes a plurality of first containers symmetrically arranged with respect to the central rotation axis; the supply part and the discharge part includes a plurality of second containers symmetrically arranged with respect to the central rotation axis, and the second containers are each divided by a barrier wall into two compartments respectively forming the supply part and the discharge part; and the plurality of first containers and the two second containers are symmetrically arranged around the central rotation axis in a circular ring shape.

According to an embodiment of the present invention, there is provided a centrifugation method for separating substances from a body fluid and tissue using a centrifugation device, the centrifugation device including: a separation container configured to receive, centrifuge, and clean a body fluid and tissue therein and rotate around a central rotation axis; a supply part connected to the separation container and configured to supply a cleaning solution to the separation container; a discharge part connected to the separation container and configured to receive substances separated by centrifugation; and a driving device configured to rotate the separation container, the supply part, and the discharge part around the central rotation axis, the centrifugation method including: a first process of filling the separation container with a body fluid and tissue; a second process of separating substances by rotating the separation container, the supply part, and the discharge part; a third process of pressing the separated substances in the separation container in a direction opposite a centrifugal force direction by reducing centrifugal force; and a fourth process of discharging the separated substances to the discharge part through an outlet connected to the separation container.

Preferably, the centrifugation method includes a fifth process of filling the separation container with a cleaning solution by increasing rotational force to move a piston in the separation container in the centrifugal force direction.

Preferably, the first to fourth processes are repeated, or the first to fifth processes are repeated to repeat separation, cleaning, and separation of the substances.

According to an embodiment of the present invention, there is provided a separation container used in a centrifugation device for separating substances according to centrifugal force applied thereto, the separation container including: a cylinder including an opened side on a lengthwise end thereof and an outlet formed in another lengthwise end thereof; a cover closing the opened side of the cylinder; a piston placed in the cylinder; an elastic part placed between the cover and the piston and applying elastic force to the piston; a piston fixing part configured to lock the piston to fix the piston; and a release part configured to release the piston fixed by the piston fixing part, wherein the piston fixing part locks the piston to fix the piston when the piston is placed in a predetermined position, and the release part is moved according to centrifugal force applied thereto and releases the piston locked by the piston fixing part.

Preferably, a locking groove is formed in a lateral side of the piston, a locking hole is formed in a portion of a lateral side of the cylinder to expose the locking groove according to a displacement of the piston, the piston fixing part includes a locking arm, a latch is formed on an end of the locking arm for connection with the locking groove, and fixing and releasing of the piston are determined according to a displacement of the locking arm.

Preferably, the piston fixing part further includes: a locking axle placed in a center region of the locking arm in a length direction of the locking arm; and a spring applying elastic force to another end of the locking arm, wherein the locking arm rotates on the locking axle according to compression and extension of the spring. When the spring is extended, the latch of the locking arm protrudes toward an inside of the cylinder through the locking groove formed in the piston and locks in the locking groove. When the spring is compressed, the latch of the locking arm departs from the inside of the cylinder, and locking between the latch and the locking groove is released.

Preferably, the release part is placed on an lateral outer side of the cylinder and movable in a length direction of the cylinder, and when centrifugal force is applied to the release part, the release part is moved in a direction from an end to another end of the cylinder, applying an external force to the other end of the locking.

Preferably, the separation container is rotated around a central rotation axis adjacent to the outlet at a distance in a length direction of the separation container to apply centrifugal force to separation container in the length direction of the separation container, and the release part is moved by the centrifugal force in the direction of the centrifugal force. Although the centrifugal force is decreased, the release part is not moved backward because a means for returning the release part is not provided, and thus a stated in which locking is released is maintained.

Preferably, a side of the piston adjacent to the outlet is inwardly recessed to form a cone shape.

Preferably, the separation container further includes a casing provided outside the cylinder in a lateral direction of the cylinder and extending in a length direction of the cylinder, wherein the casing and the cylinder are spaced apart from each other by a predetermined distance to form a release part path in which the release part is movable, and the release part is movable along the release part path in the length direction of the cylinder.

Preferably, the separation container further includes a casing provided outside the cylinder in a lateral direction of the cylinder and extending in a length direction of the cylinder, wherein the release part is placed on a lateral outside of the casing and movable along the length direction of the cylinder, the casing includes a second locking hole to expose the locking hole, the other end of the locking arm is exposed outside the casing, the latch of the locking arm protrudes toward the inside of the cylinder through the second locking hole and the locking hole and locks in the locking groove formed in the piston, the spring is placed between the outside of the casing and the other end of the locking arm and applies elastic force to the other end of the locking arm, and when the release part pushes the other end of the locking arm, the spring is compressed, and locking between the latch and the locking groove is released.

Advantageous Effects of the Invention

In the centrifugation device or a centrifugation system according to the present invention, separated substances may be cleaned and discharged while the separation container is rotated. That is, substances of tissue may be centrifuged and discharged at the same time without having to stop the rotation of the separation container to discharge substances. Therefore, separated substances may not be mixed again while being discharged, and thus substances may be more efficiently separated. In addition, while the separation container is rotated, a cleaning solution is supplied to the separation container to clean separated substances, and this cleaning process may be repeated during a centrifugation process to guarantee separation of pure substances having fewer impurities.

MODE OF THE INVENTION

Hereinafter, preferred embodiments of the present invention will be described with reference to the accompanying drawings.

Figure 1:
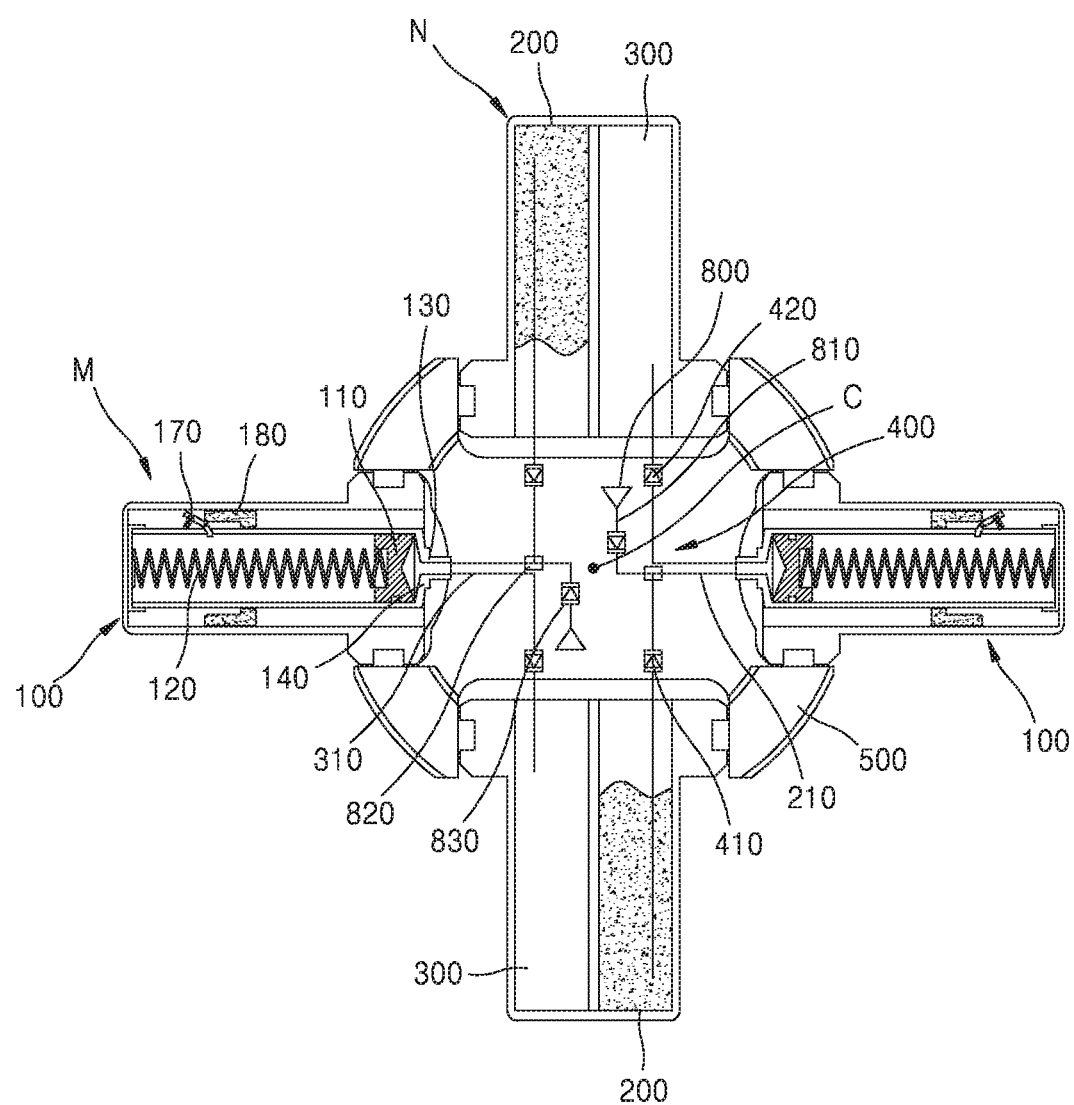
FIG. 1 is a view illustrating a ready state of a centrifugation device according to an embodiment of the present invention.
Figure 2:
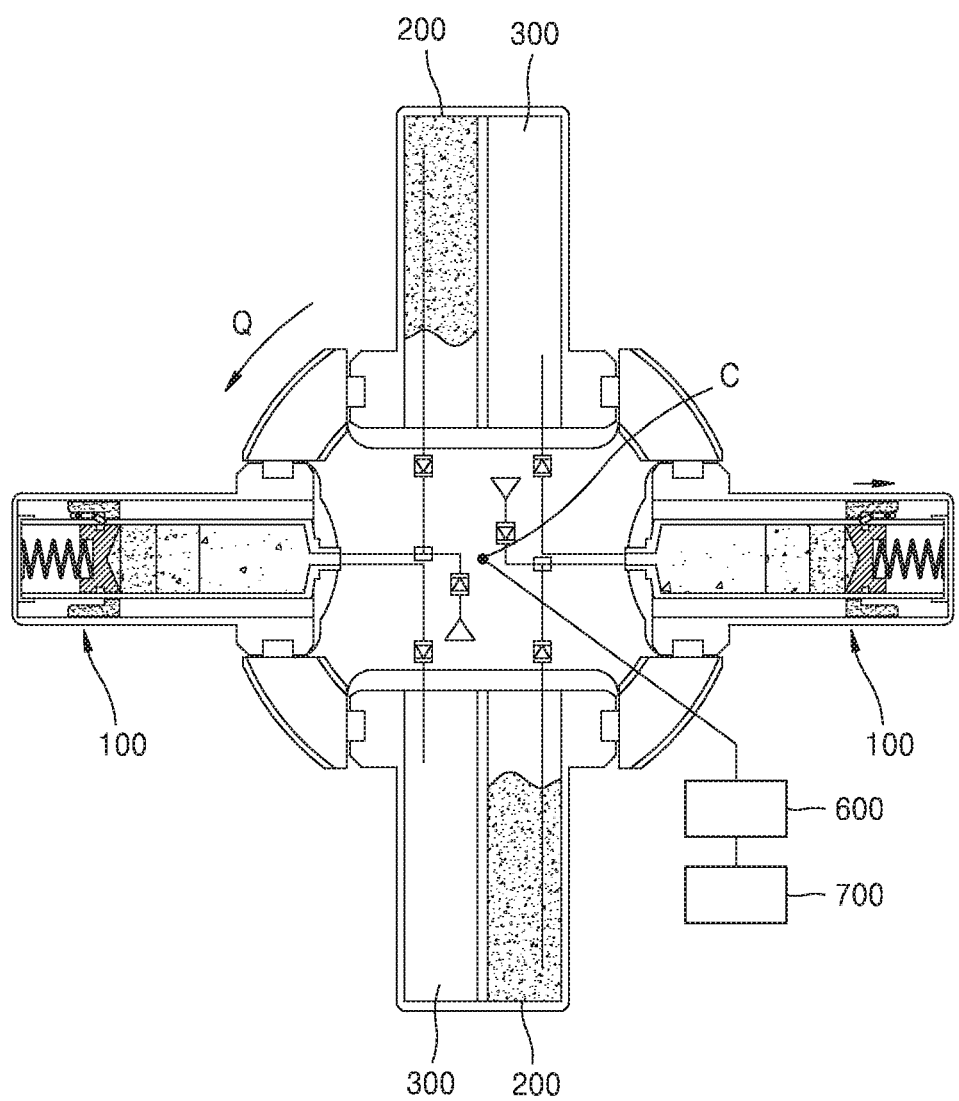
FIG. 2 is a view illustrating a state of the centrifugation device in which a driving device and a controller are connected to each other according to an embodiment of the present invention.
Figure 3:
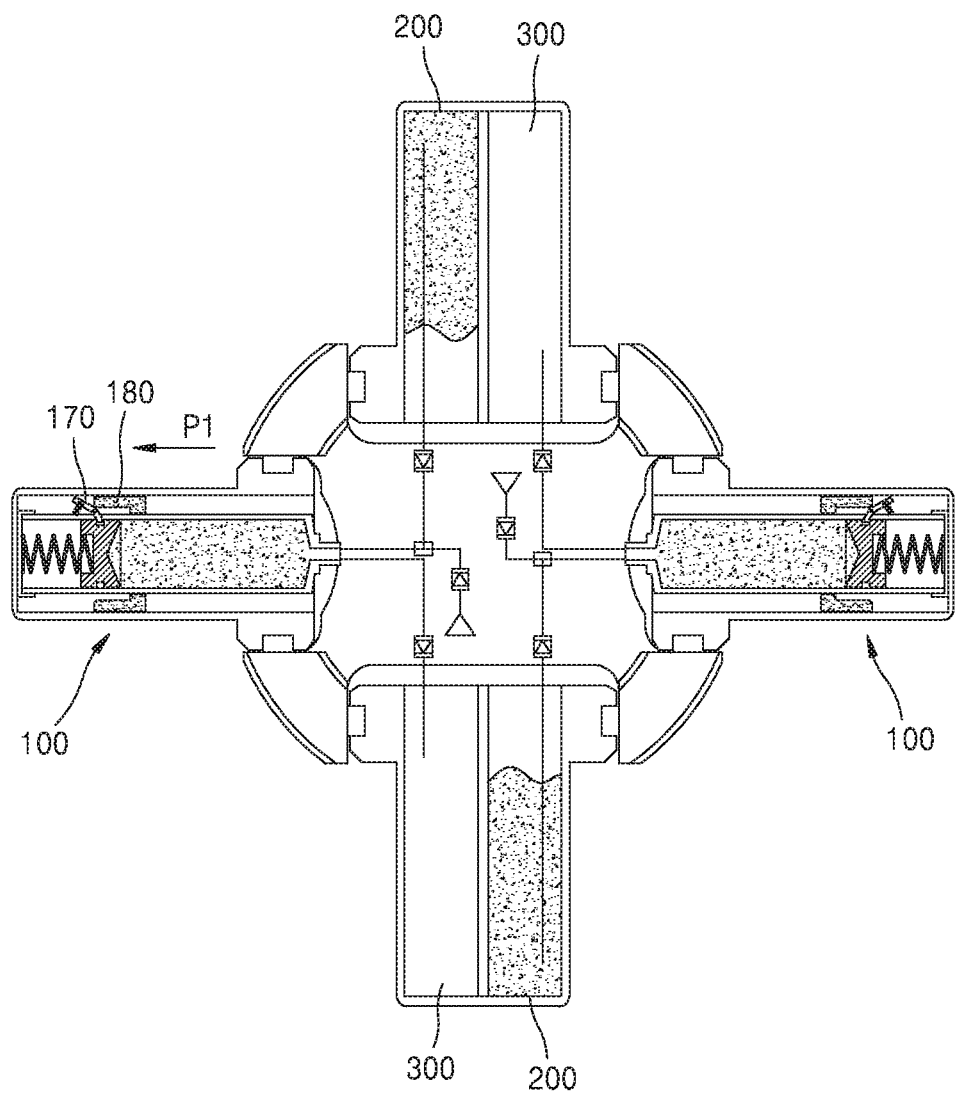
FIG. 3 is a view illustrating a state of the centrifugation device in which a material to be separated is filled in the centrifugation device according to an embodiment of the present invention.
Figure 4:
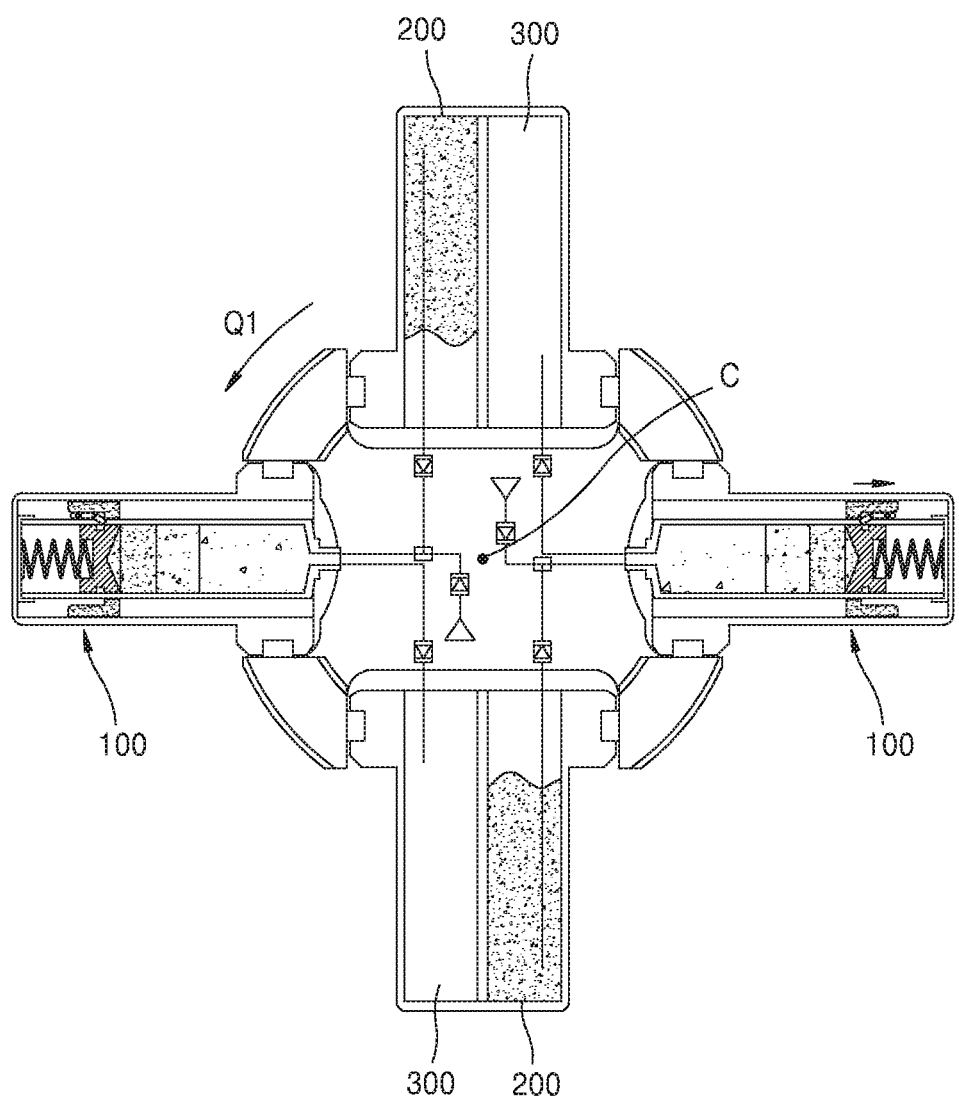
FIG. 4 is a view illustrating a centrifugation state of the centrifugation device according to an embodiment of the present invention.
Figure 5:
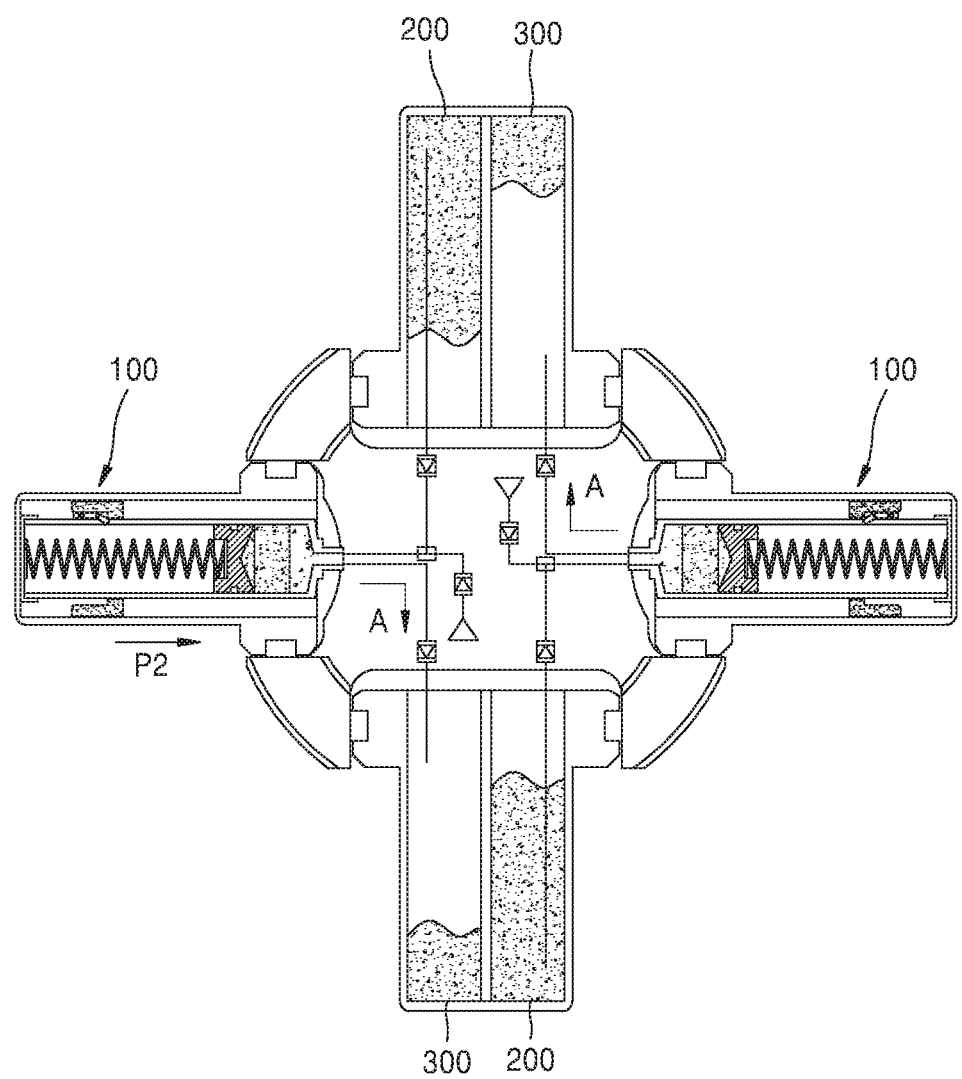
FIG. 5 is a view illustrating a state of the centrifugation device in which separated substances are discharged through a deceleration operation according to an embodiment of the present invention.
Figure 6:
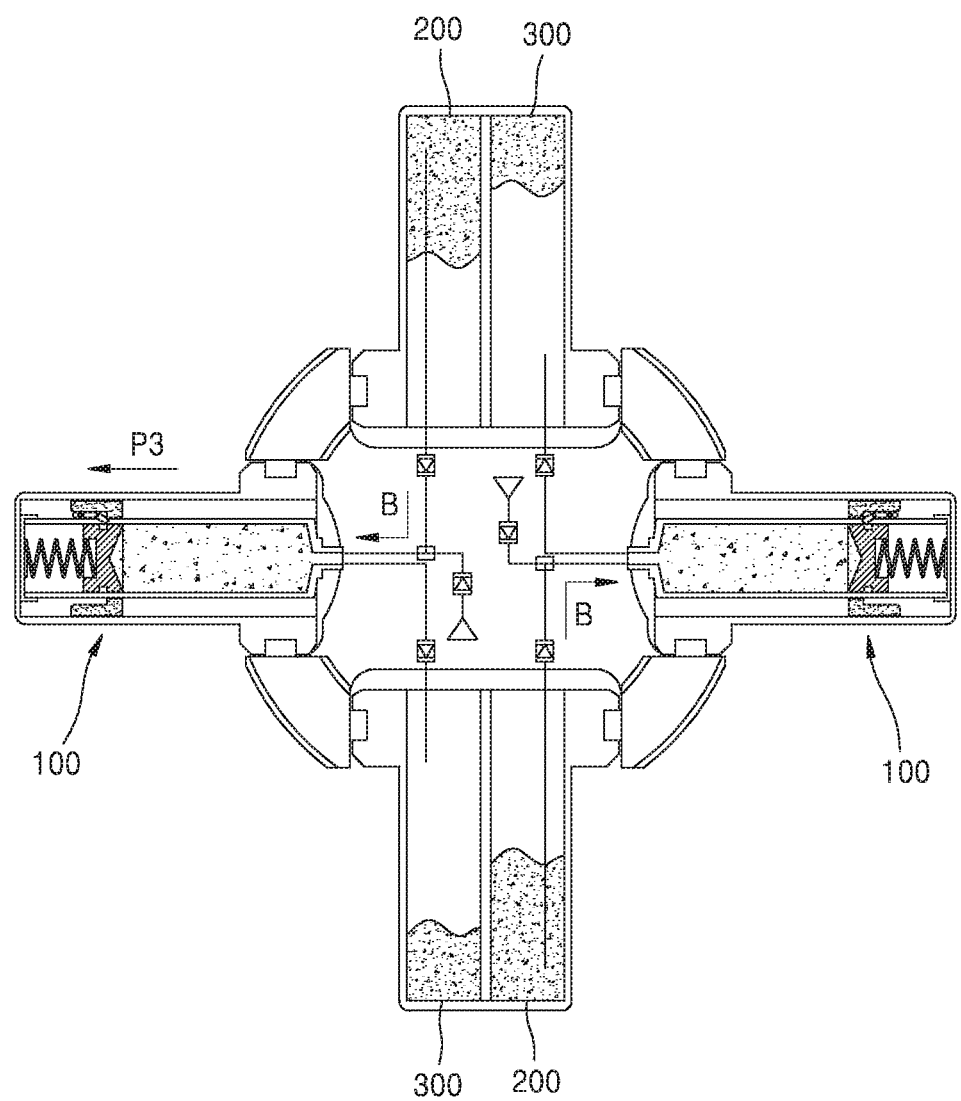
FIG. 6 is a view illustrating a state of the centrifugation device in which a cleaning solution is filled in the centrifugation device through an acceleration operation according to an embodiment of the present invention.
Figure 7:
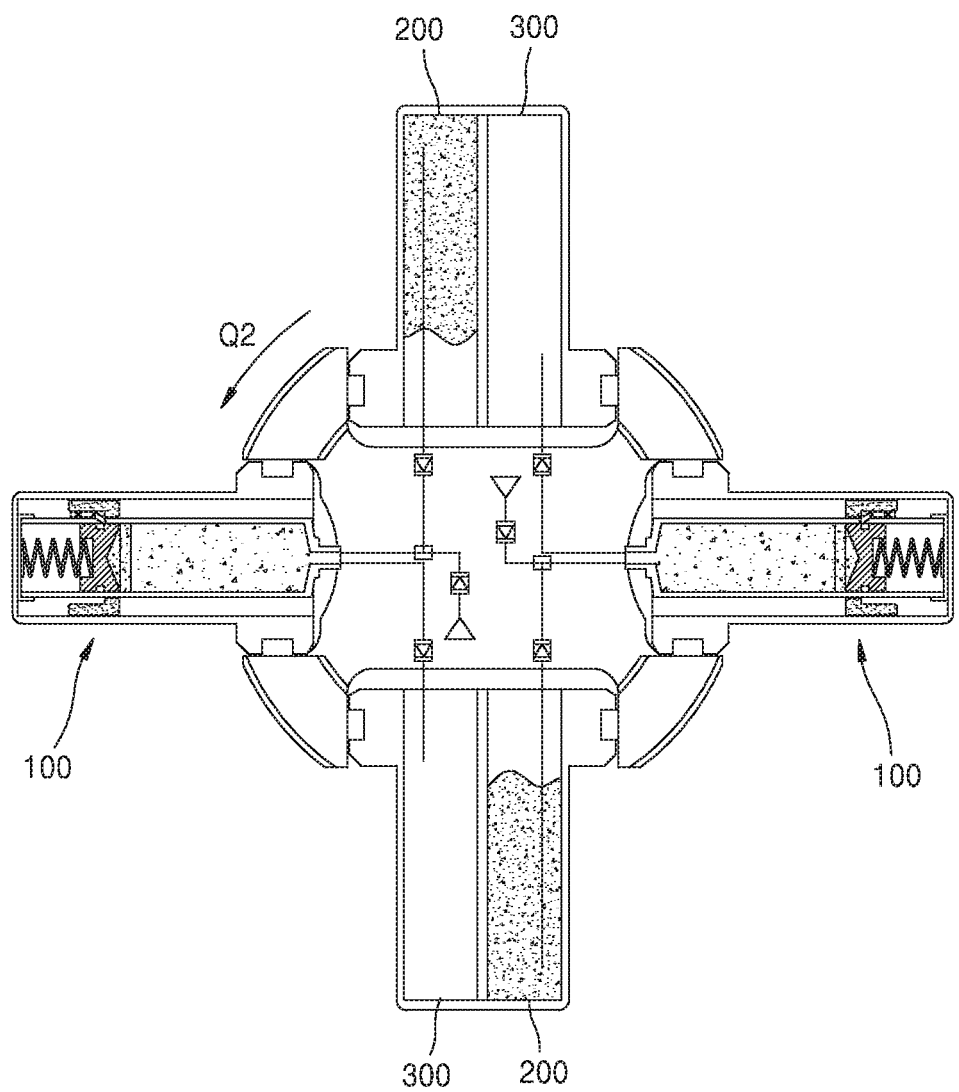
FIG. 7 is a view illustrating a centrifugation state of the centrifugation device according to an embodiment of the present invention.
Figure 8:
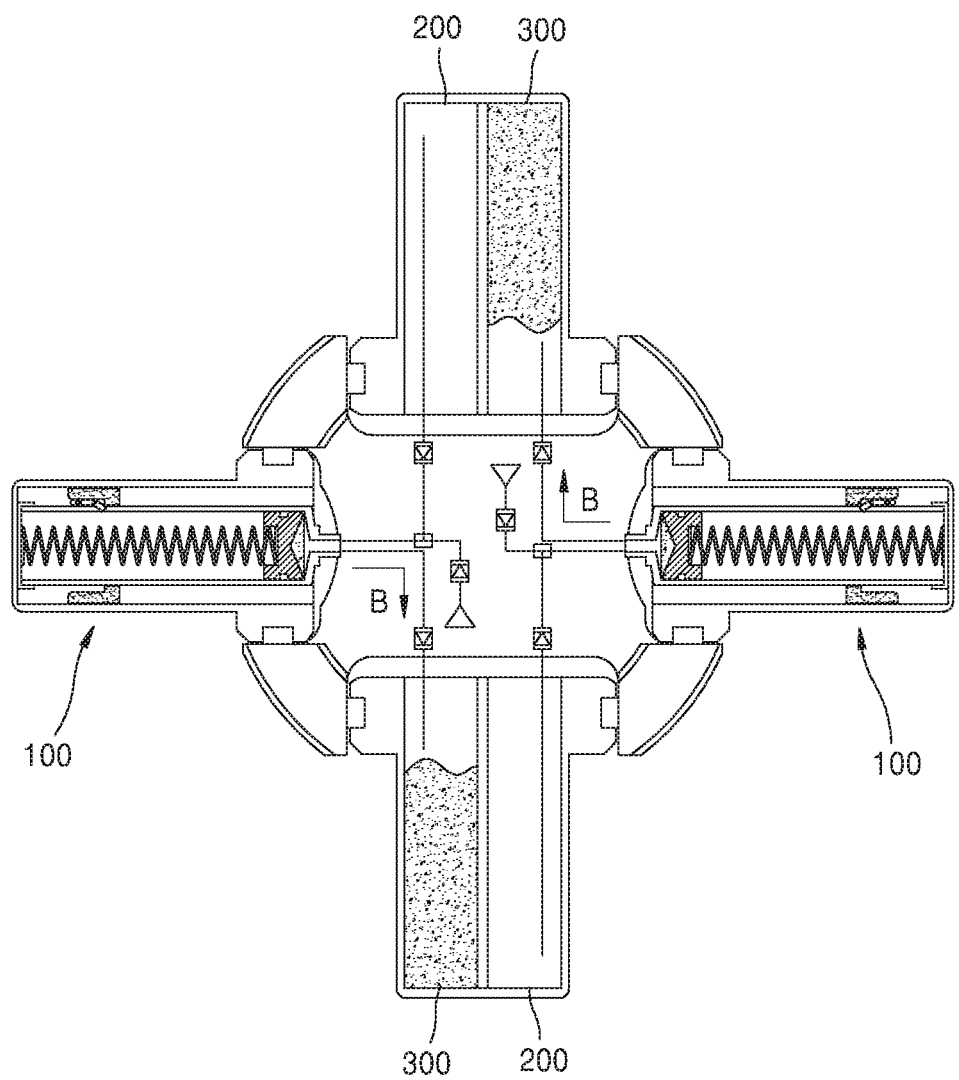
FIG. 8 is a view illustrating a state of the centrifugation device in which separated substances are discharged through a deceleration operation according to an embodiment of the present invention.

FIGS. 1 to 8 are views of a centrifugation device, illustrating how the centrifugation device and various substances are operated and moved in a centrifugation process according to embodiments of the present invention. FIG. 1 is a view illustrating a ready state of the centrifugation device according to an embodiment of the present invention, and FIG. 2 is a view schematically illustrating a state in which a driving device and a controller are connected to each other. FIG. 3 is a view illustrating a state in which a material to be centrifuged is filled, FIG. 4 is a view illustrating a centrifugation state, FIG. 5 is a view illustrating a state in which separated substances are discharged through a deceleration operation, FIG. 6 is a view illustrating a state in which a cleaning solution is filled through an acceleration operation, FIG. 7 is a view illustrating a centrifugation state, and FIG. 8 is a view illustrating a state in which separated substances are discharged through a deceleration operation.

According to embodiments of the present invention, the centrifugation device is for separating substances from body fluids and tissue and includes: separation containers 100; supply parts 200; discharge parts 300; valves 400; a driving device 600; and a controller 700. The separation containers 100 include pistons 110 and elastic parts 120.

The separation containers 100 are members providing spaces in which materials such as body fluids, tissue, or cleaning solutions can be filled. Materials such as a body fluid, tissue, or a cleaning solution are filled in the separation containers 100, and operations such as an operation of centrifuging the body fluid and tissue and a cleaning operation with the cleaning solution are substantially performed in the separation containers 100. The number of the separation containers 100 is two or more, and the separation containers 100 may be symmetrically arranged left and right with respect to a central rotation axis C.

The separation containers 100 will now be described in detail.

First, the separation containers 100 include the pistons 110, the elastic parts 120, inlets 130, outlets 140, cylinders 150, piston fixing parts 170, and release parts 180.

The cylinders 150 are configured like a container. In a length direction of the cylinders 150, ends of the cylinders 150 are opened sides through which internal spaces of the cylinders 150 are exposed, and the other ends of the cylinder 150 are penetrated to form the inlets 130 and the outlets 140. The outlets 140 may function as the inlets 130.

The pistons 110 and the elastic parts 120 are arranged inside the cylinders 150. For example, when two separation containers 100 are symmetrically arranged left and right with respect to the central rotation axis C as illustrated in FIG. 1, the elastic parts 120 are arranged outside the pistons 110 in radial directions. And the pistons 110 are arranged between the elastic parts 120 and the central rotation axis C. And the pistons 110 are connected to the elastic parts 120. In this state, the elastic parts 120 may push the pistons 110 in directions toward the central rotation axis C.

The pistons 110 may be formed of a relatively heavy material or may include relatively heavy members so that centrifugal force may be effectively applied to the pistons 110 when the centrifugation device is operated. For example, members such as weights may be included in the pistons 110.

The outlets 140 are provided to discharge a material such as a body fluid, tissue, or a cleaning solution pushed by the pistons 110 in directions toward the central rotation axis C. That is, since the outlets 140 are located inside the pistons 110 based on the central rotation axis C around which the separation containers 100 rotate, a material contained in the cylinders 150 may be discharged through the outlets 140 when pushed by the pistons 110 and the elastic parts 120.

In addition, a body fluid, tissue, or a cleaning solution may be introduced through the outlets 140. That is, the outlets 140 may function as the inlets 130. In other words, the inlets 130 and the outlets 140 may be provided as the same members through which a material is supplied and discharged. That is, for example, members having holes may be provided, and a material such as a cleaning solution may be supplied to the separation containers 100 and discharged from the separation containers 100 through the holes. That is, the holes may function as the inlets 130 and the outlets 140.

When tissue and a body fluid are initially supplied, the piston fixing parts 170 fix the pistons 110 so as to prevent the pistons 110 from unnecessarily pushing the tissue and the body fluid. When the pistons 110 reach certain positions as the tissue and the body fluid are supplied, the piston fixing parts 170 may fix the pistons 110.

The release parts 180 may be provided to release the pistons 110 from the piston fixing parts 170 when centrifugal force is applied to the release parts 180 by operation of the driving device 600. The type and structure of the release parts 180 will be described later.

When the centrifugation device of the present invention is filled with a material such as tissue and a body fluid and ready to operation, the above-described structure of the centrifugation device prevents the material from being pressed, and thus unnecessary discharge or leakage of the material may be prevented. The operation of the separation containers 100 will be specifically described later according to a specific embodiment.

The supply parts 200 are connected to the separation containers 100 to supply a cleaning solution to the separation containers 100. The supply parts 200 are configured to contain a cleaning solution and supply the cleaning solution to the separation containers 100. To this end, the supply parts 200 include supply lines 210 shaped like a pipe, and the supply lines 210 are connected to the separation containers 100. In this case, the supply lines 210 may be connected to the inlets 130 of the separation containers 100.

The mechanism and principle for supplying a cleaning solution contained in the supply parts 200 to the separation containers 100 are described above. That is, when a cleaning solution is supplied through the inlets 130, the cleaning solution pushes the pistons 110 against the elastic force of the elastic parts 120 and enters the cylinders 150.

The discharge parts 300 are connected to the separation containers 100 so that a material such as a cleaning solution or tissue may be discharged from the separation containers 100 to the discharge parts 300 after centrifugation.

That is, the supply parts 200 are provided to supply a cleaning solution to the separation containers 100, and the discharge parts 300 are connected to the separation containers 100 so that a material such as a cleaning solution or tissue may be discharged from the separation containers 100 after centrifugation. The discharge parts 300 have spaces to store a discharged material such as a cleaning solution or tissue.

In addition, the discharge parts 300 include discharge lines 310 shaped like a pipe connected to the separation containers 100 so as to transfer cells obtained by centrifugation from the separation containers 100 to the discharge parts 300. The discharge lines 310 may be connected to the outlets 140 of the separation containers 100.

Separated substances may be pushed by the pistons 110 provided in the separation containers 100 and may thus be discharged to the discharge parts 300 through the outlets 140 and the discharge lines 310. The mechanism and principle of this operation will be specifically described later.

Containers each forming a supply part 200 and a discharge part 300 may be provided. For example, each of the containers may have an internal space divided by a barrier wall into a space forming a supply part 200 and a space forming a discharge part 300. The containers may be symmetrically arranged with reference to the central rotation axis C. In this manner, the separation containers 100, the supply parts 200, the discharge parts 300 may be alternately arranged in a cross shape around the central rotation axis C.

In addition, connection parts 500 may be provided to connect the separation containers 100, the supply parts 200, and the discharge parts 300, thereby guaranteeing smooth rotation. In this manner, the separation containers 100, the supply parts 200, and the discharge parts 300 may be connected through the connection parts 500 in a circular ring shaped arrangement. That is, the separation containers 100, the supply parts 200, and the discharge parts 300 may be arranged in a circular shape around the central rotation axis C, and the connection parts 500 may connect the separation containers 100, the supply parts 200, and the discharge parts 300.

That is, in the centrifugation device, the separation containers 100, the supply parts 200, and the discharge parts 300 are arranged in a plane, and the central rotation axis C extends in a direction perpendicular to the plane. Two first containers M forming the separation containers 100 are symmetrically arranged around the central rotation axis C.

And the supply parts 200 and the discharge parts 300 are provided in second containers N. The number of the second containers N is two, and the second containers N are also symmetrically arranged around the central rotation axis C. In this case, the two first containers M and the two second containers N may be arranged in a cross (+) shape around the central rotation axis C and may be symmetrical with respect to the central rotation axis C. In addition, each of the second containers N may be divided into two compartments by a barrier wall, and the supply parts 200 and the discharge parts 300 may respectively be formed in the compartments of the second containers N.

In the above-described structure, the number of the first containers M is two, and the number of the second containers N is two. However, the number of the first containers M and the number of the second containers N may be arbitrarily selected, and the first containers M and the second containers N may be arranged in a circular shape around the central rotation axis C. In this case, the first containers M and the second containers N may be symmetrically arranged around the central rotation axis C so as to be easily rotated around the central rotation axis C. That is, the first containers M may preferably be symmetrical and opposite each other in a diameter direction with respect to the central rotation axis C, and the second containers N may preferably be symmetrical and opposite each other in a diameter direction with respect to the central rotation axis C. However, the arrangements of the first containers M and second containers N are not limited thereto.

The valves 400 are provided between the supply parts 200, the discharge parts 300, and the separation containers 100 to control flows between the supply parts 200, the discharge parts 300, and the separation containers 100. In detail, the valves 400 may be provided in the supply lines 210 and the discharge lines 310 to control supply of a cleaning solution from the supply parts 200 to the separation containers 100 and discharge of a material such as the cleaning solution, tissue, or cells from the separation containers 100 to the discharge parts 300.

In this case, as illustrated in FIG. 1, the valves 400 may include supply valves 410 provided in the supply lines 210 and discharge valves 420 provided in the discharge lines 310.

Each of the supply valves 410 and the discharge valves 420 may be a one-way valve. That is, the supply valves 410 may only be opened in one direction in which a cleaning solution is supplied from the supply parts 200 to the separation containers 100 so as to prevent backflow, and the discharge valves 420 may only be opened in one direction in which substances are discharged from the separation containers 100 to the discharge parts 300.

The driving device 600 rotates the separation containers 100, the supply parts 200, and the discharge parts 300. For example, the driving device 600 may include a motor, a power supply configured to supply power to the motor, and a connection unit connecting the motor to the separation containers 100 to transmit rotational power of the motor. The driving device 600 may rotate the separation containers 100 around the central rotation axis C.

In this case, the central rotation axis C is located in an outer region of the separation containers 100, the supply parts 200, and the discharge parts 300. That is, as illustrated in FIG. 1, the separation containers 100, the supply parts 200, and the discharge parts 300 are rotated around the central rotation axis C which is located in an outer region thereof.

In this case, the driving device 600 may be installed in a direction perpendicular to the separation containers 100, the supply parts 200, and the discharge parts 300. This means that the separation containers 100, the supply parts 200, and the discharge parts 300 are installed in a plane, and the driving device 600 is installed in a direction perpendicular to the plane. In this case, the expression "in a direction perpendicular to the plane" is used to denote that the central rotation axis C of rotation by the driving device 600 is in a direction perpendicular to the plane and the driving device 600 is not required to stand at a right angle or in a direction perpendicular to the plane.

In this case, the central rotation axis C of rotation by the driving device 600 may be located at a center among the separation containers 100, the supply parts 200, and the discharge parts 300. That is, as described above, the separation containers 100, the supply parts 200, the discharge parts 300 may be arranged in a cross (+) shape, and the central rotation axis C of rotation by the driving device 600 may be located at the center of the cross shape. In this case, substances may easily be separated, cleaned, or supplied by centrifugal force. This will be described later in detail.

The controller 700 controls operations of the driving device 600 and rotation of the separation containers 100, the supply parts 200, and the discharge parts 300. The controller 700 may control the driving device 600 to adjust the rotational velocity of the separation containers 100. That is, the separation containers 100 may be rotated at a desired velocity. The controller 700 may include an arithmetic unit and a CPU and may control the driving device 600 according to signals input from a sensor or an input device.

Preferably, the controller 700 may control opening and closing of the valves 400 according to the rotational velocity of the separation containers 100 to discharge substances separated in the separation containers 100 through the discharge parts 300. In addition, the controller 700 may control the pressing force of the elastic parts 120. That is, the controller 700 may control the magnitude of elastic force or pressing force of the elastic parts 120.

The controller 700 and the driving device 600 are schematically illustrated in FIG. 2. For example, the driving device 600 may provide rotational power to cause rotation (indicated by Q) around the central rotation axis C, and the controller 700 may control the operation of the driving device 600. Although the structures of the controller 700 and the driving device 600 are not clearly illustrated, the controller 700 and the driving device 600 constitute the centrifugation device and a centrifugation system according to the present invention. The structures of the controller 700 and the driving device 600 are not limited.

External inlets 800, inlet lines 810, 3-way valves 820, and inlet valves 830 may be provided to fill the separation containers 100 with a material such as tissue or a body, and the inlet lines 810, the 3-way valves 820, and the inlet valves 830 may be connected as illustrated in FIG. 1. That is, the external inlets 800 may be connected to the supply lines 210 through the inlet lines 810 and the 3-way valves 820. The inlet valves 830 may be provided in the inlet lines 810.

Hereinafter, the operation of the centrifugation device will be described according to the present invention.

In the centrifugation device or a centrifugation system of the present invention, the valves 400 are provided at the discharge parts 300, and as the controller 700 controls the rotation of the separation containers 100 and opening and closing of the valves 400, substances separated by centrifugal force during rotation of the separation containers 100 may be discharged.

First, as illustrated in FIG. 3, the separation containers 100 are filled with a material such as tissue or a body fluid. At this time, a material such as tissue or a body fluid is filled in the separation containers 100 through the external inlets 800 using an injection means such as a syringe. When tissue and a body fluid are supplied to the separation containers 100 through the external inlets 800, the 3-way valves 820 may connect the external inlets 800 to the separation containers 100, and after the supply of tissue and body fluid, the 3-way valves 820 may connect the separation containers 100 to the supply parts 200.

In this case, as illustrated in FIG. 3, when tissue and a body fluid are supplied, the pistons 110 supported by the elastic parts 120 may be pushed by the tissue and body fluid as indicated by an arrow P1. Then, when the pistons 110 reach the piston fixing parts 170, the pistons 110 are fixed.

Next, as illustrated in FIG. 4, the separation containers 100, the supply parts 200, and the discharge parts 300 are rotated as indicated by an arrow Q1. As illustrated in FIG. 4, while the separation containers 100 are rotated for centrifugation, substances included in the tissue are separated according to their specific gravities by centrifugal force. During this process, relatively heavy substances such as fat may be collected in a region relatively distant from the central rotation axis C, and relatively light substances may be collected in a region relatively close to the central rotation axis C.

In addition, during the rotation, the release parts 180 are moved outward by centrifugal force, and thus the piston fixing parts 170 release the pistons 110. At this time, although the pistons 110 are not fixed by the piston fixing parts 170, the positions of the pistons 110 are not changed owing to the balance between the centrifugal force and the elastic force of the elastic parts 120, and thus the tissue and body fluid are not pressed by pistons 110.

Next, as illustrated in FIG. 5, when the rotational velocity of the separation containers 100 is reduced, the magnitude of centrifugal force applied to the tissue and the pistons 110 is reduced, and thus the elastic force of the elastic parts acting on the pistons 110 may become larger than the centrifugal force. Thus, the pistons 110 may push separated substances inward as indicated by an arrow P2.

Therefore, as illustrated in FIG. 5, substances relatively adjacent to the central rotation axis C are first discharged to the discharge parts 300 as indicated by arrows A, and then substances relatively distant from the central rotation axis C are discharged. In this manner, substances may be separately discharged.

At this time, the lightest substance is first discharged through the outlets 140. That is, since a relatively heavy substance is located in an outer region and a relatively light substance is located in an inner region as a result of rotation, the relatively light substance is first discharged through the outlets 140.

Until a desired substance is discharged and obtained, rotation and centrifugal force may be controlled. After a desired substance is discharged, the rotation of the centrifugation device may be maintained at a predetermined velocity to fix the pistons 110 to positions at which centrifugal force and elastic force are balanced and thus to stop discharge of separated substances. Alternatively, the valves 400 may be closed to stop discharge of separated substances.

After a first centrifugation process is performed as described above, the rotational velocity of the centrifugation device may be increased to supply a cleaning solution filled in the supply parts 200 to the separation containers 100.

That is, as illustrated in FIG. 6, a cleaning solution is filled in the separation containers 100. At this time, for example, the rotational velocity of the separation containers 100 is increased, and then the pistons 110 are moved away from the central rotation axis C, decreasing the inside pressure of the cylinders 150. Thus, the cleaning solution filled in the supply parts 200 may be supplied to the separation containers 100 as indicated by arrows B.

As a result, the cleaning solution is mixed with substances remaining in the separation containers 100, and then the rotation of the centrifugation device is maintained at a constant velocity indicated by an arrow Q in FIG. 7 to separate the cleaning solution from the remaining substances.

Thereafter, the above-mentioned centrifugation process is performed again. That is, as illustrated in FIG. 8, when the rotational velocity is decreased, the cleaning solution located adjacent to the central rotation axis C because of its relatively low specific gravity is discharged through the discharge parts 300 as indicated by arrows B, and the remaining substances are only in the separation containers 100. In this manner, the cleaning solution is mixed with the remaining substances and then discharged, thereby cleaning the remaining substances. That is, the remaining substances may be repeatedly cleaned by repeating the above-mentioned process, and thus highly pure substances having fewer impurities may be obtained. Particularly, since cleaning is essential when stem cells are separated from adipose tissue treated with an enzyme, this cleaning process may be effective used for separation of stem cells.

During such a centrifugation process, the controller 700 controls the rotation of the separation containers 100 to carry out separation and discharge of substances. In addition, the controller 700 may control opening and closing of the valves 400 to supply tissue and discharge substances separated from the tissue.

According to the present invention, substances separated as the separation containers 100 are rotated may be cleaned and discharged. That is, components of tissue may be centrifuged, discharged, and cleaned at the same time. Thus, the efficiency of the centrifugation device may be improved.

In addition, since substances are discharged while the separation containers 100 are rotated for centrifugation, that is, it is unnecessary to stop the separation containers 100 to discharge separated substances, separation of substances may be more reliably performed. In other words, when the separation containers 100 are stopped to discharge separated substances, centrifugal force applied to the separated substances may disappear, and thus the separated substances may be mixed again. In this case, separation of substances may not be reliably performed. In the centrifugation device and a centrifugation system of the present invention, separated substances may be discharged only by controlling the rotational velocity of the separation containers 100 while the separation containers 100 are rotated for centrifugation, and thus separated substances may not be mixed again while being discharged. Thus, separation of substances may be performed more reliably and efficiently.

In addition, a cleaning solution is supplied to clean separated substances, and this cleaning process is repeated if necessary. Thus, highly pure substances having few impurities may be obtained.

The centrifugation device of the present invention may be provided as a system. That is, according to an embodiment of the present invention, a centrifugation system for separating substances contained in a body fluid and tissue may include: the separation containers 100 configured to receive, centrifuge, and clean a body fluid and tissue by rotating around a central rotation axis; the supply parts 200 connected to the separation containers 100 and configured to supply a cleaning solution to the separation containers 100; the discharge parts 300 connected to the separation containers 100 and configured to discharge substances separated by centrifugation; the valves 400 configured to control flows between the supply parts 200, the discharge parts 300, and the separation containers 100; the driving device 600 configured to rotate the separation containers 100, the supply parts 200, and the discharge parts 300 around the central rotation axis and installed in a direction perpendicular to the separation containers 100, the supply parts 200, and the discharge parts 300; and the controller 700 configured to control operations of the driving device 600. The separation containers 100 include: the pistons 110 arranged in outer regions relatively distant from the central rotation axis in a diameter direction; and the elastic parts 120 arranged outside the pistons 110 in a diameter direction and pushing the pistons 110 in directions opposite centrifugal force directions. When the separation containers 100 are rotated, the valves 400 may be opened or closed to discharge separated substances from the separation containers 100 to the discharge parts 300.

Preferably, the controller 700 controls the driving device 600 to adjust the rotational velocity of the separation containers 100 and opens or closes the valves 400 according to the rotational velocity of the separation containers 100 to adjust discharge of separated substances from the separation containers 100.

According to an embodiment of the present invention, a centrifugation method for separating substances of tissue includes: a first process of filling the separation containers 100 with a body fluid and tissue; a second process of rotating the separation containers 100, the supply parts 200, and the discharge parts 300 around the central rotation axis; a third process of reducing rotational force to push the tissue filled in the separation containers 100 in directions opposite centrifugal force directions; and a fourth process of discharging substances separated in the separation containers 100 to the discharge parts 300 through the outlets 140 connected to the separation containers 100.

Preferably, according to the embodiment of the present invention, the centrifugation method may include a fifth process of increasing rotational force to move the elastic parts 120 in the centrifugal directions in the separation parts 120 and thus to fill the separation containers 100 with a cleaning solution. As described above, the cleaning solution may be previously filled in the supply parts 200. To this end, a process of filling the cleaning solution in the supply parts 200 may be previously performed. This cleaning solution filling process may be performed at the same time with the first process of filling the separation containers 100 with the tissue and the body fluid. However, this is a non-limiting example.

As described above, the first to fourth processes may be repeated, or the first to fifth processes may be repeated to repeat separation, cleaning, and separation of substances.

According to the present invention, the centrifugation method may be performed using the centrifugation device and the centrifugation system. In addition, the centrifugation method of the present invention has the same effects as those by the centrifugation device or the centrifugation system. That is, the efficiency of centrifugation may be improved, and since substances separated by centrifugation are discharged after being repeatedly cleaned, the reliability and efficiency of substance separation may be improved.

Figure 9:
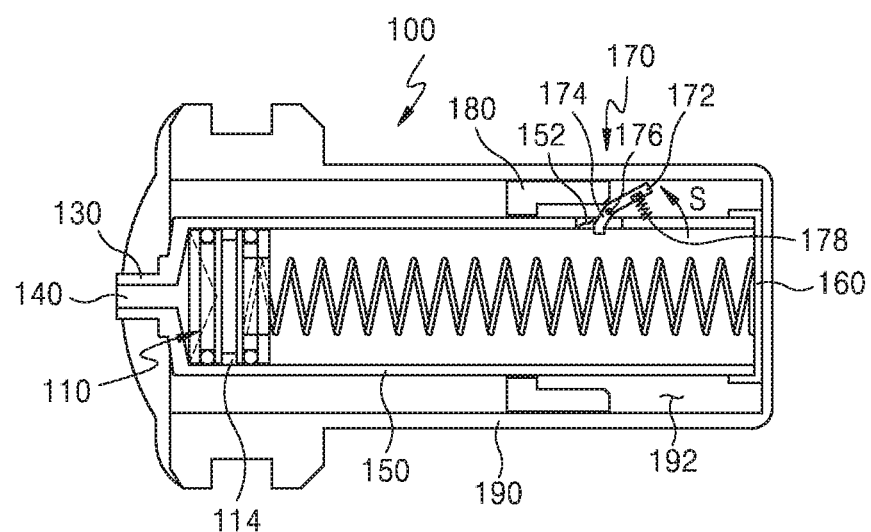
FIG. 9 is a view illustrating a separation container according to an embodiment of the present invention.
Figure 10:
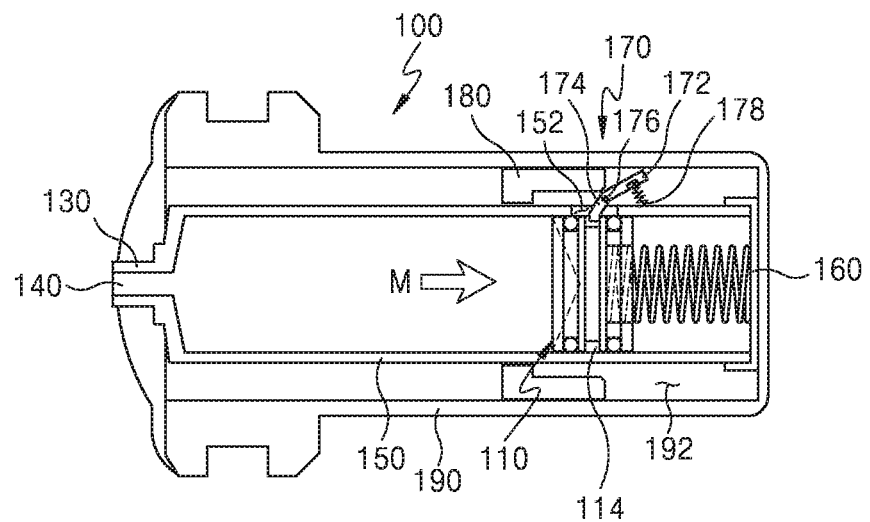
FIG. 10 is a view illustrating the separation container according to an embodiment of the present invention.
Figure 11:
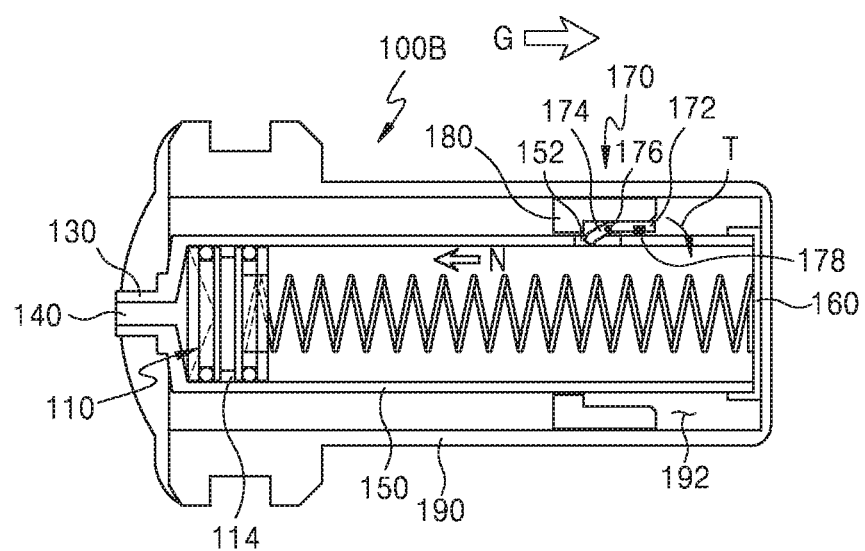
FIG. 11 is a view illustrating the separation container according to an embodiment of the present invention.
Figure 12:
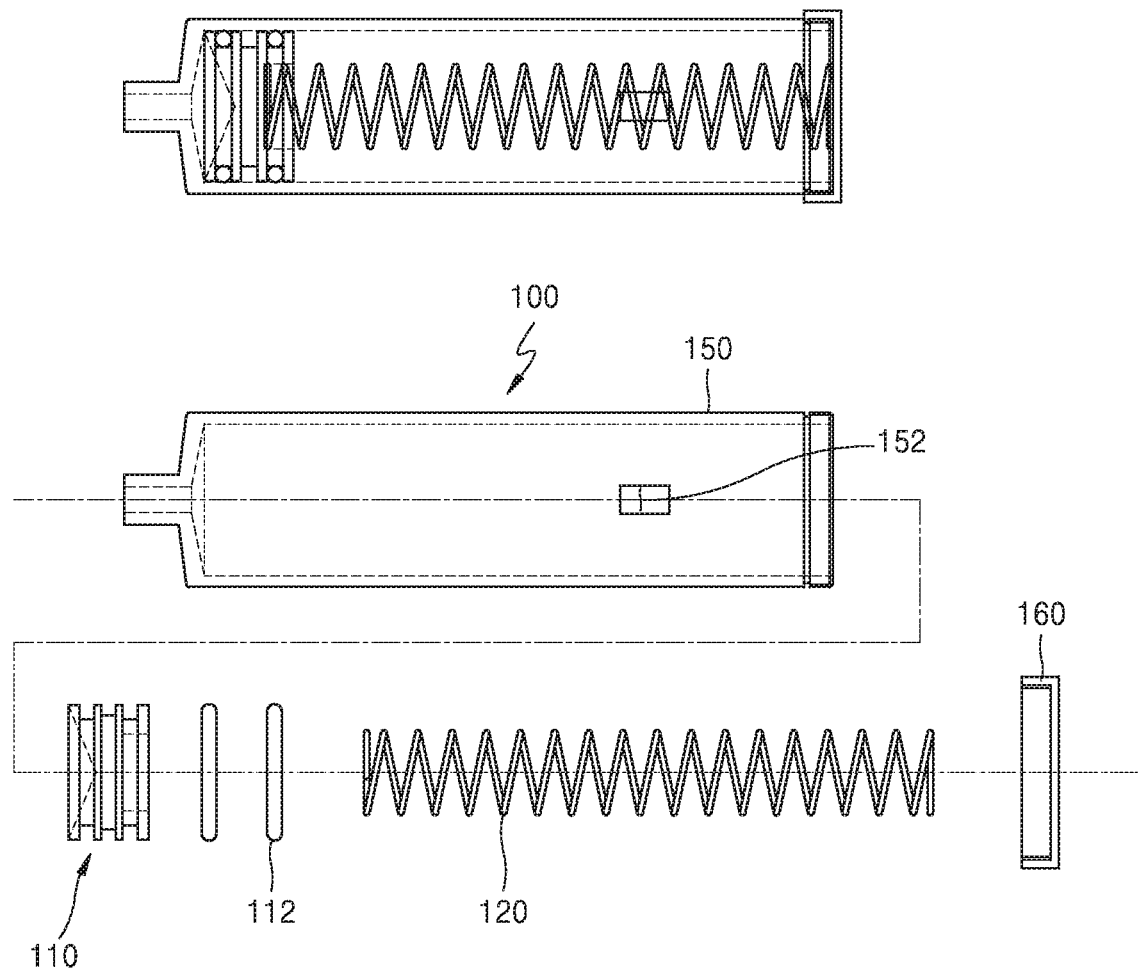
FIG. 12 is a view illustrating a dissembled state of the separation container according to an embodiment of the present invention.

FIGS. 9 to 11 are views illustrating a separation container 100 according to an embodiment of the present invention, and FIG. 12 is a view illustrating a dissembled state of the separation container 100 according to the embodiment of the present invention.

The separation container 100 of the present invention may be used in a centrifugation device and will now be described in detail. However, the separation container 100 may be configured as an independent device. The following description of the separation container 100 may be applied to the case in which the separation container 100 is used in a centrifugation device. However, the separation container 100 is not limited to use in a centrifugation device. That is, the separation container 100 may be used independently of a centrifugation device.

The separation container 100 of the present invention is for use in a centrifugation device configured to separate substances by centrifugal force. The separation container 100 includes: a cylinder 150; a cover 160; a piston 110; an elastic part 120; a piston fixing part 170; and a release part 180. Since the cylinder 150, the piston 110, the elastic part 120, the piston fixing part 170, and the release part 180 are similar or equal to those described in the above, descriptions thereof will be omitted, or simple descriptions thereof will be presented. In the following description, specific configurations thereof will be mainly described.

A locking hole 152 is formed in a lateral portion of the cylinder 150. The locking hole 152 may penetrate a lateral side of the cylinder 150.

The cover 160 closes an opened side of the cylinder 150. For example, the cover 160 may be connected to an end portion forming the opened side using screws.

The piston 110 is the same as those described above. The piston 110 includes a seal ring 112 for tight contact with an inner wall of the cylinder 150.

A front portion of the piston 110 may be shaped liked a concavely recessed cone. The front portion of the piston 110 faces an outlet 140. That is, a side of the piston 110 adjacent to the outlet 140 may be inwardly recessed. Owning to the recessed structure, substances such as cells separated from tissue contained in the cylinder 150 may be easily accommodated.

A locking groove 114 may be formed in a lateral side of the piston 110. That is, as illustrated in FIG. 9, the locking groove 114 may be formed in a lateral side of the piston 110 making contact with the cylinder 150. The locking groove 114 may be formed along the circumference of the lateral side of the piston 110 or may be formed at least in a region of the lateral side of the piston 110.

The piston fixing part 170 locks the piston 110 to fix the piston 110. The piston fixing part 170 includes a locking arm 172 shaped like a bar. The locking arm 172 has a predetermined length, and a latch 174 is formed on a lengthwise end of the locking arm 172 for lock in the locking groove 114.

The release part 180 may be a ring-shaped member placed around a lateral portion of the separation container 100 and may be moved by centrifugal force when the separation container 100 is rotated. However, the release part 180 is not limited thereto. The release part 180 may include a member having a predetermined weight so as to easily receive centrifugal force.

In addition, as illustrated in FIGS. 9 to 11, a casing 190 may be provided around a lateral side of the cylinder 150 in a position spaced apart from the cylinder 150 by a predetermined distance so as to form a double pipe structure together with the cylinder 150. Owing to the predetermined distance, a release part path 192 may be formed. That is, the release part path 192 may be located between the casing 190 and the cylinder 150, and the release part 180 may move along the release part path 192. In this case, the separation container 100 may be connected to another member or device via the casing 190. Owing to the release part path 192, the release part 180 may move without interference with other members or parts.

The piston fixing part 170 may fix the piston 110 as follows.

As the piston 110 moves in the cylinder 150, the locking groove 114 formed in the lateral side of the piston 110 is exposed through the locking hole 152. Here, the expression "as the piston 110 moves, the locking groove 114 is exposed" means that as the piston 110 moves in the length direction of the cylinder 150, the locking groove 114 formed in the lateral side of the piston 110 is aligned with the locking hole 152 and is thus exposed through the locking hole 152. However, if the locking groove 114 is not aligned with the locking hole 152 after the piston 110 moves, the locking groove 114 is covered with the lateral side of the cylinder 150.

When the locking groove 114 is exposed through the locking hole 152 as described above, the latch 174 of the locking arm 172 is locked in the locking groove 114, and then this locking may be released according to the movement of the locking arm 172. To this end, the piston fixing part 170 is located in the position of the locking hole 152.

In this case, specifically, locking and releasing may be achieved according to the movement of the locking arm 172 owing to the structure of the locking arm 172 described below in detail.

The piston fixing part 170 includes: the locking arm 172; the latch 174 provided on an end of the locking arm 172; a locking axle 176 placed in a center region in the length direction of the locking arm 172; and a spring 178 applying elastic force to another end of the locking arm 172. The locking arm 172 may undergo angular motion according to compression or extension of the spring 178.

When the spring 178 is extended, the other end of the locking arm 172 is moved upward, and the latch 174 of the locking arm 172 protrudes toward the inside of the cylinder 150 through the locking hole 152. Therefore, the latch 174 is locked into the locking groove 114 formed in the piston 110.

On the other hand, when the spring 178 is compressed, the latch 174 of the locking arm 172 departs from the inside of the cylinder 150, and thus locking between the locking groove 114 and the latch 174 is released. That is, when the spring 178 is compressed as the other end of the locking arm 172 is moved downward by the release part 180, the latch 174 is released from the locking hole 152, and thus locking between the locking arm 172 and the locking groove 114 may be released.

The spring 178 is placed between a lateral side of the cylinder 150 and the other end of the locking arm 172 to apply elastic force to the locking arm 172. As illustrated in FIGS. 8 to 10, the spring 178 may be connected between the cylinder 150 and the locking arm 172, and the locking arm 172 may be placed in the release part path 192.

In this case, as indicated by arrows S and T in FIGS. 9 and 11, the locking arm 172 may be rotated on the locking axle 176 by a predetermined angle. The locking axle 176 is located in a center region of the locking arm 172. However, the locking axle 176 is not limited thereto. The locking axle 176 may be connected and fixed to the separation container 100 using a connection means such as a jig, and the locking arm 172 may be rotated on the locking axle 176.

A specific operation of the release part 180 will now be described.

When centrifugal force is applied to the release part 180, the release part 180 may be moved in a direction from one end to another end of the cylinder 150. And thus the release part 180 may apply external force to the other end of the locking arm 172, causing compression of the spring 178. Here, the direction from one end to another end of the cylinder 150 may be a direction from the outlet 140 of the cylinder 150 to the cover 160. That is, the locking arm 172 is placed on a movement path of the release part 180 so that the locking arm 172 may be moved by the release part 180. The locking arm 172 may be released from the locking groove 114 when the spring 178 is compressed by the release part 180 pushing the other end of the locking arm 172.

The release part 180 may be moved as the separation container 100 rotates, that is, during a centrifugation process.

An operation of the separation container 100 having the above-described structure will now be described.

Tissue and a body fluid are injected through the external inlet 800 and the inlet 130 using an external injection means. As described above, the outlet 140 may also function as the inlet 130. Then, as illustrated in FIG. 10, when the piston 110 is moved outward to the position of the piston fixing part 170 as indicated by an arrow M, the latch 174 of the locking arm 172 is caught in the locking groove 114 formed in the piston 110, and thus the piston 110 is locked and fixed. At this time, the spring 178 applies elastic force as indicated by an arrow S, thereby guaranteeing locking.

Next, as illustrated in FIG. 11, the release part 180 is moved to the locking arm 172 by centrifugal force. When the release part 180 rotates the locking arm 172 as indicated by an arrow T, locking between the latch 174 and the locking groove 114 is released. At this time, when centrifugal force decreases, the piston 110 is moved inward by the elastic part 120 as indicated by an arrow N, and thus separated substances are discharged through the outlet 140. At this time, the release part 180 does not return, and thus the releasing of the piston 110 from locking is performed only once.

Figure 13:
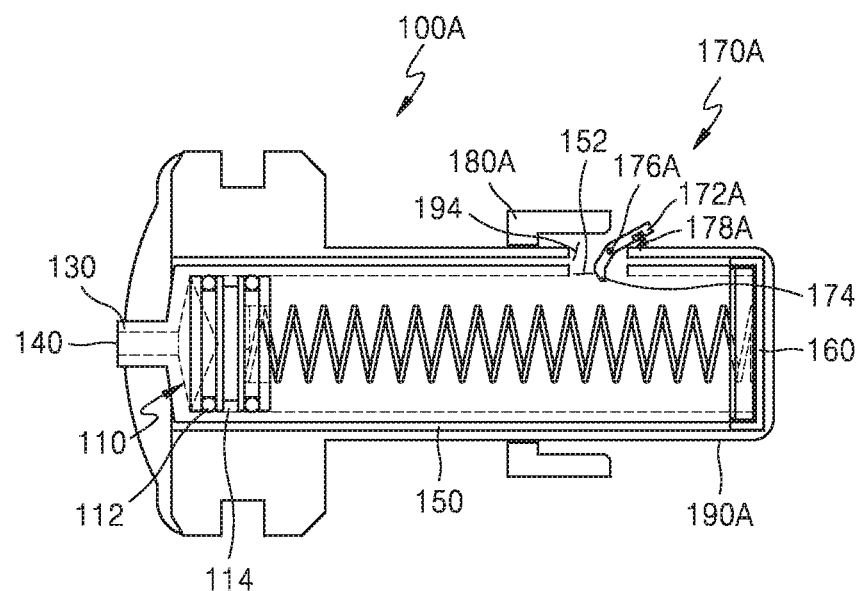
FIG. 13 is a view illustrating a separation container according to an embodiment of the present invention.
Figure 14:
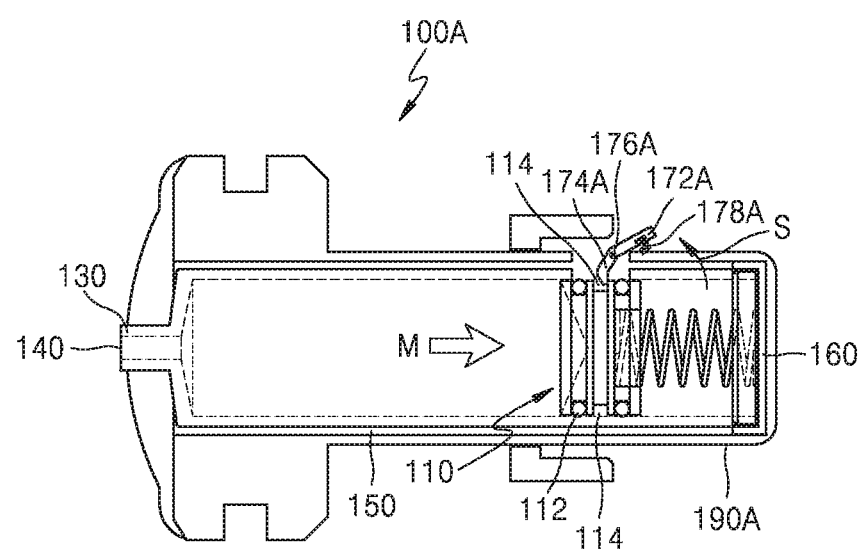
FIG. 14 is a view illustrating the separation container according to an embodiment of the present invention.
Figure 15:
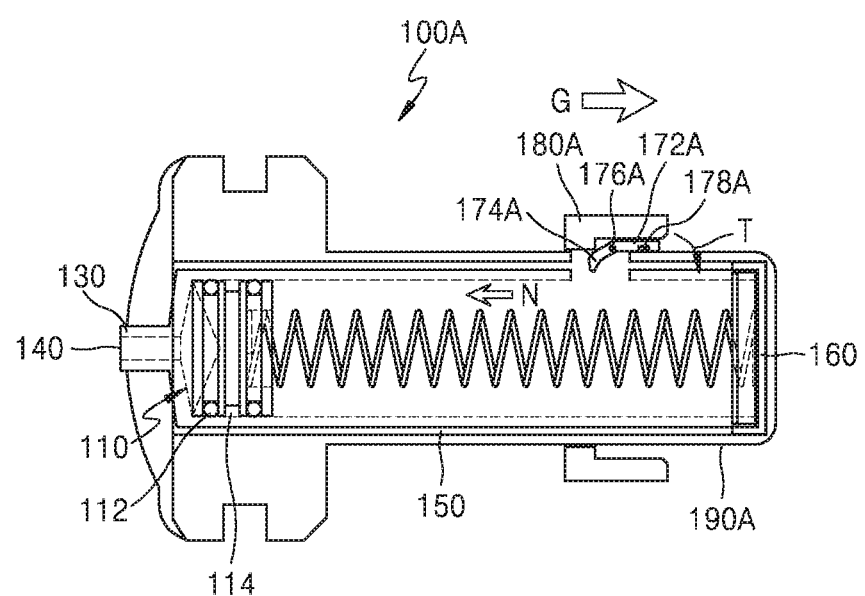
FIG. 15 is a view illustrating the separation container according to an embodiment of the present invention.

FIGS. 13 to 15 are views illustrating a separation container 100A according to another embodiment of the present invention.

The structure and operation of the separation container 100A illustrated in FIGS. 13 to 15 are similar to those of the separation container 100 illustrated in FIGS. 9 to 12.

The structures and operations of parts of the separation container 100A indicated with reference numbers in FIGS. 13 to 15 may not be described if they are the same as those of the separation container 100 described above. That is, please refer to the description presented with reference to FIGS. 9 to 12 for some parts illustrated in FIGS. 13 to 15. Hereinafter, a casing 190A, a release part 180A, a locking arm 172A, a latch 174A, a locking axle 176A, and a spring 178A will be described to help understanding of differences.

The separation container 100A illustrated in FIGS. 13 to 15 is different from the separation container 100 illustrated in FIGS. 9 and 10 in that the casing 190A surrounding the lateral side of a cylinder 150 is adjacent to the cylinder 150 without a release part path 192 being formed therebetween, and the release part 180A is configured to move along the outside of the casing 190A.

That is, the casing 190A is provided on the outside of the cylinder 150, and the release part 180A is provided on the outside of the casing 190A in such a manner that the release part 180A may be moved along the outside of the casing 190A in the length direction of the cylinder 150.

In this case, the locking arm 172A is positioned such that the latch 174A may be located inside the cylinder 150 and another end of the locking arm 172A may be located outside of the casing 190A. That is, the other end of the locking arm 172A may be exposed outside the cylinder 150, and the latch 174A of the locking arm 172A may protrude inside the cylinder 150 through a locking hole 152 and a second locking hole 194 so as to be locked in a locking groove 114 of a piston 110. In addition, the spring 178A is placed between the casing 190A and the other end of the locking arm 172A so as to apply elastic force. In addition, the locking axle 176A may be connected to the casing 190A.

Since the other end of the locking arm 172A is exposed to the outside of the casing 190A, the locking arm 172A may be manipulated by the release part 180A. In addition, since the latch 174A of the locking arm 172A is placed in the cylinder 150 for connection with the piston 110, the second locking hole 194 is aligned with and communicates with the locking hole 152 formed in a lateral portion of the cylinder 150.

When the spring 178A is compressed as the release part 180A pushes the other end of the locking arm 172A, locking between the latch 174A and the locking groove 114 may be released as described with reference to FIGS. 9 to 11.

Although preferable embodiments have been described with reference to the accompanying drawings, the present invention is not limited to the embodiments. Therefore, it will be readily understood by those skilled in the art that various modifications and changes can be made thereto without departing from the spirit and scope of the present invention defined by the appended claims, and these modifications and changes should not be construed independently of the spirit and scope of the present invention.

The invention claimed is:

1. A centrifugation device for separating substances from a body fluid and tissue using centrifugal force, the centrifugation device comprising:
   a separation container configured to receive, centrifuge, and clean a body fluid and tissue therein and rotate around a central rotation axis;
   a supply part connected to the separation container and configured to supply a cleaning solution to the separation container;
   a discharge part connected to the separation container and configured to receive substances separated by centrifugation;
   valves configured to control flows between the supply part, the discharge part, and the separation container;
   a driving device configured to rotate the separation container, the supply part, and the discharge part around the central rotation axis, the driving device being installed in a direction perpendicular to the separation container, the supply part, and the discharge part; and
   a controller configured to control an operation of the driving device,
   wherein the separation container comprises:
      an outlet connected to the discharge part for discharge substances therethrough;
      a piston located outside of the outlet in a radial direction based on the central rotation axis; and
      an elastic part located outside of the piston in a radial direction based on the central rotation axis configured to apply pressure to the piston in an opposite direction of centrifugal force, wherein:
         when a rotational velocity of the driving unit increases, the piston of the separation container is moved in a centrifugal force direction, and a cleaning solution flows from the supply part to the separation container and fills the separation container; and when the rotational velocity of the driving unit decreases, the elastic part moves the piston of the separation container in a direction opposite the centrifugal force direction, and separated substances in the separation container are discharged to the discharge part.

2. The centrifugation device of claim 1, wherein the controller controls the operation of the driving device so as to adjust a rotational velocity at which the separation container, the supply part, and the discharge part are rotated.

3. The centrifugation device of claim 1, wherein the separation container comprises a piston fixing part controlling a displacement of the piston caused by the elastic part by fixing the piston in a predetermined position.

4. The centrifugation device of claim 3, wherein when the piston arrives at the predetermined position, the piston fixing part fixes the piston by locking the piston, and when centrifugal force is applied by operation of the driving device, the piston fixing part releases the piston.

5. The centrifugation device of claim 1, wherein the separation container, the supply part, and the discharge part are arranged in a common plane;

the central rotation axis extends in a direction perpendicular to the plane;

the separation container comprises two first containers symmetrically arranged on opposite sides of the central rotation axis;

the supply part and the discharge part comprise two second containers symmetrically arranged on opposite sides of the central rotation axis, and the second containers are each divided by a barrier wall into two compartments respectively forming the supply part and the discharge part; and the two first containers and the two second containers are symmetrically arranged around the central rotation axis in a cross shape.

6. The centrifugation device of claim 1, wherein the separation container, the supply part, and the discharge part are arranged in a common plane;

the central rotation axis extends in a direction perpendicular to the plane;

the separation container comprises a plurality of first containers symmetrically arranged with respect to the central rotation axis;

the supply part and the discharge part comprise a plurality of second containers symmetrically arranged with respect to the central rotation axis, and the second containers are each divided by a barrier wall into two compartments respectively forming the supply part and the discharge part; and the plurality of first containers and the second containers are symmetrically arranged around the central rotation axis in a circular ring shape.

* * * * *